United States Patent [19]
Land

[11] 3,798,667
[45] Mar. 19, 1974

[54] TEMPERATURE RESPONSIVE SWITCH FOR USE IN A SELF-DEVELOPING CAMERA

[75] Inventor: Edwin H. Land, Cambridge, Mass.

[73] Assignee: Polaroid Corporation, Cambridge, Mass.

[22] Filed: Mar. 5, 1973

[21] Appl. No.: 338,322

[52] U.S. Cl. ................. 95/11 R, 95/53 E, 337/333
[51] Int. Cl. ........................................... G03b 19/00
[58] Field of Search ............. 95/11 R, 53 E, 31 EL; 337/333, 362

[56] References Cited
UNITED STATES PATENTS
2,794,377  6/1957  Fairbank................................. 95/13
3,171,109  2/1965  Appel ................................. 337/362

*Primary Examiner*—Richard L. Moses

[57] ABSTRACT

Photographic apparatus, e.g., a camera, for exposing a photosensitive element located in position for exposure within the camera. The camera is provided with temperature responsive structure for preventing the initiation of an exposure cycle when the ambient temperature is outside a predetermined range. In a preferred embodiment, the camera includes a motor connectable to a source of energy, e.g., a battery, for operating various sub-systems of the camera, e.g., a shutter, and the aforementioned temperature responsive structure is a bimetallic structure which functions to connect the motor to the source of energy when the ambient temperature is within the predetermined range and to disconnect the motor from the source of energy when the ambient temperature is outside the predetermined range. In an alternative embodiment, the temperature responsive structure takes the form of a resilient bimetallic member which defines one contact of a normally open switch located in an exposure control circuit. During normal operation, the resilient member is manually flexed to close the switch and initiate an exposure cycle. As the ambient temperature changes to a value outside of the predetermined range, the curvature of the bimetallic member increases to a point whereat the member can no longer be manually flexed into a position wherein the switch will be closed.

12 Claims, 5 Drawing Figures

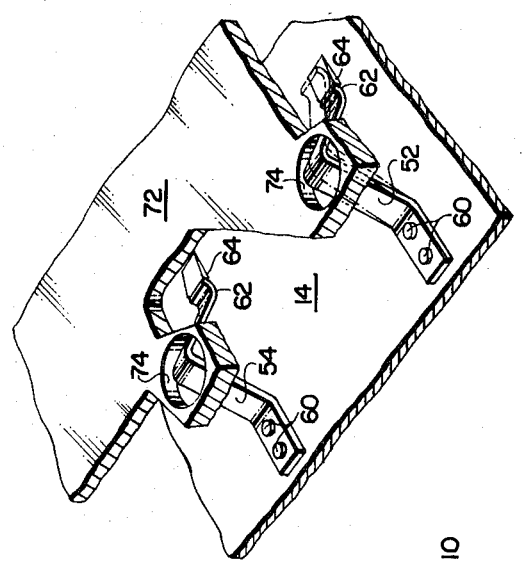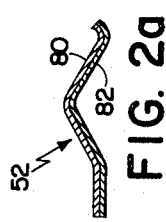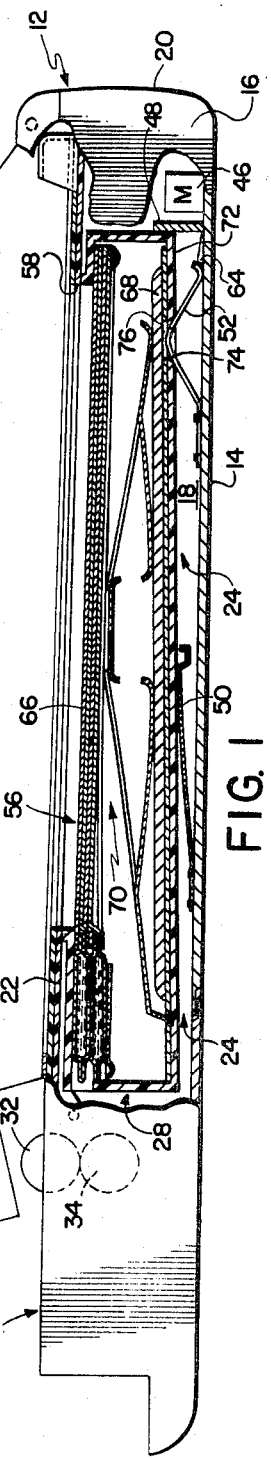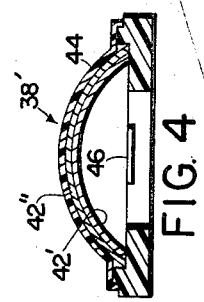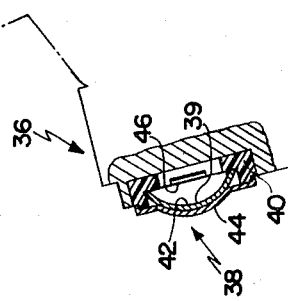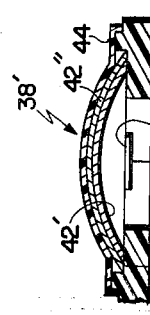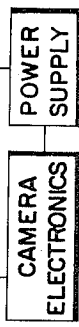

3,798,667

TEMPERATURE RESPONSIVE SWITCH FOR USE IN A SELF-DEVELOPING CAMERA

CROSS REFERENCE TO RELATED APPLICATIONS

This application is related to copending application Ser. No. 318,228 filed Dec. 26, 1972, by Land et al. and entitled "Photographic Apparatus."

BACKGROUND OF THE INVENTION

1. Field of the Invention

This invention relates to photographic apparatus having a thermal control for preventing the initiation of an exposure cycle during those periods when the ambient temperature is outside of a predetermined temperature range.

2. Description of the Prior Art

The present invention is concerned with thermal controls for preventing operation of photographic apparatus during periods when the ambient temperature is either too cold or too hot for proper operation of the photographic apparatus. Generally, photographic apparatus, e.g., cameras, have a temperature range in which operation of the various mechanical components is optimized. However, when the ambient temperature drops to a level outside of this range, operation of the camera may be adversely affected, e.g., when the ambient temperature is too cold the viscosity of the oil used to lubricate moving elements of the components increases thereby increasing the friction between the moving elements of the components. Further, where the camera is of the type which has a battery for energizing the aforementioned components, operation of the camera during periods of low temperatures places an unusually high load on the battery which decreases its life. In those cases where the battery is a component of a film cassette and is used to power the camer's film-advancing apparatus, reducing the life span of the battery by using it during periods of abnormally low temperatures may result not only in the loss of the battery but also the loss of the unexposed film units remaining in the film cassette.

The use of thermal controls is especially beneficial when used in photographic apparatus of the self-developing type. Apparatus of the foregoing type are well known in the art and generally comprise a camera having a pair of pressure-applying members, e.g., rollers, which are adapted to rupture a container of processing liquid located near a leading end of an exposed film unit and spread the processing liquid across the photosensitive element thereof to initiate the formation of a visible image by a diffusion transfer type process. The viscosity of the processing liquid is related to the ambient temperature and as such its spreading characteristics and its ability to permeate layers of the film unit may be adversely affected by extremes in the ambient temperature thereby distracting from the appearance of the reproduced image.

SUMMARY OF THE INVENTION

The instant invention relates to photographic apparatus, e.g., cameras and, more particularly, to cameras of the self-developing type which include at least one thermal control for preventing the initiation of an exposure cycle when the ambient temperature is outside of (either above or below) a predetermined temperature range, e.g., 40° – 100° Fahrenheit. The basic concept of providing a camera with a thermal control for preventing the initiation of an exposure cycle during adverse ambient temperature conditions is disclosed in said application Ser. No. 318,228, and said disclosure was derived from me as stated in said application.

In a preferred embodiment of the invention, the camera is provided with a film cassette compartment having a pair of battery contacts in the form of leaf springs therein which function to connect the terminals of a battery located within the film cassette to a motor for operating various components of the camera. Each leaf spring is preferably in the form of an inverted V and includes at least a bimetallic, e.g., invar (iron nickel alloy) and brass, which extends substantially throughout the length of the leaf spring. One leg of each of the V-shaped leaf springs is fixedly attached to a wall of the compartment and to circuitry which connects the battery with the camera's motor. The other or free leg of each spring slidably engages a stop extending upwardly from the wall of the compartment. When a film cassette is properly positioned within the compartment, the leaf springs (1) resiliently urge the cassette against a wall of the compartment to locate an exposure aperture in the cassette in the focal plane of the camera's lens, and (2) engage the terminals of the battery to connect it into a circuit which includes the camera's motor. The bimetallic layers in each leaf spring are arranged such that ambient temperatures outside of the predetermined range will cause the free leg of one of the V-shaped springs to press against its stop with a force sufficient to enable it, the free leg, to be cammed over the stop thereby allowing the V-shaped spring to assume a more flattened configuration which, in turn, moves the apex of the V out of engagement with its associated battery terminal and disconnects the battery from the motor.

In an alternative embodiment of the invention, the camera is provided with an exposure initiating member in the form of a resilient, dome-shaped disc which functions as a movable contact of an electrical switch. The disc is formed from a bimetallic which functions to control the curvature of the disc. The disc is constructed such that upon a predetermined manual or mechanical force being exerted thereon, the disc snaps into a position wherein it forms a part of a closed switch to initiate an exposure cycle, and snaps back to its original configuration upon release of the force. The layers of the bimetallic may be positioned such that the curvature of the disc will increase as the ambient temperature approaches the upper limit of the predetermined range. Upon the ambient temperature reaching the upper limit, the curvature of the disc will have reached a degree whereat the disc will resist being deflected or snapped into its exposure initiating position by the aforementioned predetermined manual or mechanical force thereby precluding operation of the camera. To preclude operation of the camera when the ambient temperature is below the predetermined range, one merely replaces the disc with one wherein the layers of the bimetallic have been reversed.

An object of the invention is to provide photographic apparatus with a thermal control for preventing operation of the apparatus when the ambient temperature is outside of a predetermined range.

Another object of the invention is to provide photographic apparatus having a battery operated motor for driving components of the apparatus with means for automatically disconnecting the battery from the motor during periods when the ambient temperature is outside a predetermined range.

Another object of the invention is to provide photographic apparatus with an exposure initiating member which is ineffective to initiate an exposure cycle when the ambient temperature is outside a predetermined range.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWING

For a fuller understanding of the nature and objects of the invention, reference should be had to the following detailed description taken in connection with the accompanying drawing wherein:

FIG. 1 is a side view, partly in phantom and partly broken away, of photographic apparatus incorporating the instant invention;

FIG. 2 is an enlarged perspective view of a portion of the apparatus shown in FIG. 1;

FIG. 2a is a cross-sectional view of a battery contact;

FIG. 3 is a diagrammatic view of an alternative embodiment of the instant invention; and FIG. 4 is a view similar to FIG. 3, showing an exposure initiating member in its inoperative position.

DETAILED DESCRIPTION OF THE INVENTION

Reference is now made to FIG. 1 of the drawing wherein is shown photographic apparatus in the form of a camera 10 of the self-developing type, portions of the camera being shown in phantom or broken line for purposes of clarity. Camera 10 includes a main housing section 12 having a bottom wall 14, side walls 16 and 18, and an end wall 20 which cooperate with each other and an interior wall 22 to define a film cassette compartment 24 having an open end 26 through which a film cassette 28 may be inserted. Extending forwardly of housing section 12 is a second housing section 30 having a pair of pressure-applying members, e.g., rollers 32 and 34, mounted thereon. Housing section 30 is pivotally coupled to the camera for movement between the position shown in FIG. 1 wherein the rollers are in closing relation to the open end 26 of the compartment 24, and a cassette loading position wherein section 30 extends downwardly from the main housing section 12. Also extending forwardly of main housing section 12 is a lens and shutter housing 36 having an exposure initiating member 38 mounted within a recess 40. Member 38 includes a resilient, dome-shaped disc 42 having electric conducting properties and a flexible, insulating cap 44. Mounted in line with and inwardly of the apex of the dome-shaped disc 42 is a contact 46 which, together with disc 42, functions as a normally open switch whose function will be more fully described hereinafter.

Mounted within compartment 24 are a motor 46, a cassette stop 48, a spring 50, and a pair of resilient contacts 52 and 54 having a generally inverted V-shaped configuration. Spring 50 and contacts 52 and 54 function to resiliently urge film cassette 28 into engagement with wall 22 while stop 48 assists in aligning an exposure aperture 56 in cassette 28 with an exposure aperture 58 in wall 22. One leg of each contact 52 and 54 is suitably secured to wall 14 by, e.g., rivets 60 and to circuitry (not shown) connected to motor 46. The other leg of each contact includes an upturned end 62 which is normally positioned in abutting relation with a stop 64 extending upwardly from wall 14.

Film cassette 28 includes a plurality of film units 66 (only two of which are shown), a generally planar battery 68, and a platen 70 positioned between the battery 68 and the lowermost film unit 66 for resiliently urging the foremost film unit into position for exposure and the battery against the rear wall 72 of the cassette. The rear wall 72 is provided with a pair of openings 74 which are located in alignment with the terminals 76 (only one shown) of the battery. When the cassette is properly positioned within compartment 24, as shown in FIG. 1, the apex of each of the resilient contacts 52 and 54 extends into the respective opening 74 and electrically engages one of the battery terminals 76 to connect the battery into the circuit containing motor 46.

During normal operation, the subject to be photographed is properly focused and member 38 is depressed to initiate an exposure cycle. Depression of member 38 will flex disc 42 into a positon wherein its central portion 39 will snap into engagement with contact 46 thereby completing an electrical circuit between the power supply, i.e., the battery 68 and motor 46, and the electronics of the camera to initiate an exposure cycle, as more fully described in copending application Ser. No. 213,303 filed Dec. 29, 1971 and assigned in common with the instant application. In order to preclude operation of the camera when the ambient temperature is outside the aforementioned predetermined temperature range, the contacts 52 and 54 are preferably formed from a bimetallic, e.g., as shown in FIG. 2a, contact 52 includes a layer of invar (iron nickel alloy) 80 suitably attached to a layer of brass 82. The layers in contact 54 would be reversed, i.e., the brass layer would be located over the layer of invar. As the ambient temperature rises to the top of the predetermined range, contact 52 will attempt to assume a more planar configuration. However, stop 64 precludes movement of the free end 62 of the contact 52 until sufficient forces have been built up in contact 52 (ambient temperature has exceeded top of range) to enable the free end to cam itself over stop 64, as shown in dotted lines in FIG. 2. Once free of stop 64, contact 52 assumes a more planar configuration thereby moving the apex of the V-shaped contact out of electrical engagement with battery terminal 76 to disconnect the battery 68 from the motor 46. In a similar manner, contact 54 will break electrical engagement with its battery terminal as the ambient temperature falls below the predetermined range. While upwardly protruding stops 64 have been shown for facilitating the rapid disconnection between the contacts and the battery terminals, it should be noted that other means, e.g., depressions, could be used. Each depression would be located in wall 14 adjacent end 62 of the contacts. As the ambient temperature moves to a point outside of the predetermined range, the free end 62 of the contact would drop into the depression thereby moving the apex of the contact out of engagement with the battery terminal.

Reference is now made to FIGS. 3 and 4 of the drawing wherein is shown an alternative embodiment of the invention. In this embodiment, the thermal control is provided by an exposure initiating member 38. Member 38' is provided with a disc having bimetallic layers 42' and 42" of, e.g., invar and brass, respectively. As in the preferred embodiment, the disc is electrically coupled by suitable means to the camera electronics and power supply and functions as a movable contact arm in a normally open switch. During normal operation, i.e., when the ambient temperature is below a predetermined value, e.g., 100° F., member 38' is actuated to flex the disc into a position where its central portion engages fixed contact 46, thereby connecting the battery 68 to motor 46 to initiate an exposure cycle as previously described. As the ambient temperature rises to a level above the aforementioned value, the curvature of the bimetallic disc increases to a point (see FIG. 4) whereat flexure of the disc into engagement with stationary contact 46 is no longer possible. Alternatively, operation of the camera below a predetermined ambient temperature can be precluded by replacing the bimetallic disc with one wherein the layer of metal having the greater coefficient of expansion is on the inside of the curve of the disc.

Since certain changes may be made in the above apparatus without departing from the scope of the invention herein involved, it is intended that all matter contained in the above description or shown in the accompanying drawing shall be interpreted as illustrative and not in a limiting sense. For example, while the battery contacts and the disc of the exposure initiating member have been described as consisting of a bimetallic element, it should be obvious that the resiliency of these members could be increased by attaching them to a more resilient metal, e.g., spring steel, and that their electrical conductivity may be enhanced by gold plating the contact areas. Further, while the bimetallic has been shown and described as one contact of an electrical switch, it is within the scope of the invention to use the bimetallic in other ways to prevent initiation of an exposure cycle. For example, a bimetallic could be positioned next to a shutter acutating member, e.g., a shutter release button, such that it would move into the path of travel of the shutter actuating member when the ambient temperature moved to a point outside the predetermined temperature range, thereby preventing movement of the shutter actuating member.

What is claimed is:

1. Photographic apparatus comprising:
   means for exposing a photosensitive element located in position for exposure within said photographic apparatus; and
   means for operatively connecting said exposing means to a source of energy, said connecting means including temperature responsive means for disconnecting said exposing means from the source of energy when the ambient temperature is outside a predetermined range.

2. Photographic apparatus as defined in claim 1 wherein said connecting means includes an electrical circuit connectable to a source of electrical energy, and said temperature responsive means includes bimetallic means for disconnecting the source of electrical energy from said exposing means when said ambient temperature is outside said predetermined range.

3. Photographic apparatus as defined in claim 2 wherein said bimetallic means includes first means for opening said electrical circuit when said ambient temperature is below said predetermined range and second means for opening said electrical circuit when said ambient temperature exceeds said predetermined range.

4. Photographic apparatus as defined in claim 3 wherein said first and second means comprise a pair of battery contacts.

5. Photographic apparatus as defined in claim 2 wherein said electrical circuit includes a pair of contacts at least one of which is coupled to and movable by said temperature responsive means between a conducting and a nonconducting position, said photographic apparatus further including means engageable by at least said one contact for preventing movement of said contact by said temperature responsive means to said nonconducting position until said ambient temperature is outside of said predetermined range.

6. The invention as defined in claim 1 wherein said photographic apparatus is a camera of the self-developing type.

7. Photographic apparatus comprising:
   means for exposing a photosensitive element located in position for exposure within said photographic apparatus;
   means for connecting said exposing means to a source of electrical energy for operating said exposing means, said connecting means including normally open switch means movable into a closed position for initiating an exposure cycle, said switch means including temperature responsive means operable to prevent closure of said switch means when the ambient temperature is outside a predetermined range.

8. Photographic apparatus as defined in claim 7 wherein said temperature responsive means includes a resilient membrane adapted to be manually flexed into said closed position.

9. Photographic apparatus as defined in claim 8 wherein said resilient membrane includes a bimetallic section.

10. Photographic apparatus as defined in claim 9 wherein said bimetallic section is adapted to render said membrane incapable of being manually flexed to said closed position when said ambient temperature is outside said predetermined range.

11. Photographic apparatus as defined in claim 9 wherein said resilient membrane forms one contact of said normally open switch means.

12. Photographic apparatus comprising:
   means for locating a photosensitive element in position for exposure;
   means for exposing the photosensitive element; and
   temperature responsive means for preventing actuation of said exposing means when the ambient temperature is outside a predetermined temperature range.

\* \* \* \* \*